(12) United States Patent
Gandhimohan et al.

(10) Patent No.: US 12,730,859 B1
(45) Date of Patent: Sep. 8, 2026

(54) DETECTING AND PREVENTING CYBER THREATS

(71) Applicant: Morgan Stanley Services Group Inc., New York, NY (US)

(72) Inventors: Rajalakshmi Gandhimohan, Alpharetta, GA (US); Hamza Abubakar Kheruwala, Atlanta, GA (US); Erisa Caka, Warren, MI (US); Sanjay K. Rout, Edison, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/313,725

(22) Filed: Aug. 28, 2025

(51) Int. Cl.

| | |
|---|---|
| ***G06F 18/25*** | (2023.01) |
| ***G06N 20/20*** | (2019.01) |
| ***H04L 9/40*** | (2022.01) |
| ***H04L 41/16*** | (2022.01) |
| ***H04L 67/50*** | (2022.01) |

(52) U.S. Cl.
CPC ........... *G06F 18/259* (2023.01); *G06N 20/20* (2019.01); *H04L 41/16* (2013.01); *H04L 63/1425* (2013.01); *H04L 67/535* (2022.05)

(58) Field of Classification Search
CPC ....... G06F 18/25; G06F 18/259; G06N 20/20; H04L 41/16; H04L 63/1425; H04L 67/535
See application file for complete search history.

(56) References Cited

U.S. PATENT DOCUMENTS

| | | | | |
|---|---|---|---|---|
| 12,131,330 | B1 | 10/2024 | Nun et al. | |
| 12,149,558 | B1 | 11/2024 | Brown et al. | |
| 2015/0381641 | A1* | 12/2015 | Cabrera | H04L 63/1425 726/23 |
| 2017/0206557 | A1* | 7/2017 | Abrol | G06Q 50/01 |
| 2018/0248902 | A1* | 8/2018 | Dănilă-Dumitrescu | H04L 67/535 |
| 2018/0248905 | A1* | 8/2018 | Côté | H04L 43/045 |
| 2021/0021621 | A1* | 1/2021 | Janakiraman | H04L 41/142 |
| 2021/0209512 | A1* | 7/2021 | Gaddam | G06F 21/554 |
| 2021/0334606 | A1* | 10/2021 | Du | G06F 18/29 |
| 2022/0006899 | A1 | 1/2022 | Phatak et al. | |
| 2022/0172067 | A1 | 6/2022 | Kang et al. | |
| 2022/0327204 | A1* | 10/2022 | Abbaszadeh | G06F 21/552 |
| 2022/0351001 | A1* | 11/2022 | Bhuyan | G06N 20/00 |

(Continued)

OTHER PUBLICATIONS

Peppes, N., Daskalakis, E., Alexakis, T., & Adamopoulou, E. (2025). A Multimodal Framework for Advanced Cybersecurity Threat Detection Using GAN-Driven Data Synthesis. Applied Sciences, 15(15), 8730. https://doi.org/10.3390/app15158730 (Year: 2025).*

(Continued)

*Primary Examiner* — James D. Rutten
(74) *Attorney, Agent, or Firm* — Duane Morris LLP

(57) ABSTRACT

A system for detecting and preventing cyber threats is disclosed. The system is programmed to collect user activity data across different computer applications and devices and threat intelligence data in a distributed computing environment. From the collected data, the system is programmed to then build a predictive model and a counterfactual reasoning model using machine learning and establish a meta model that fuses the two models together. Given new user activity data, the system is programmed to apply the meta model to generate a threat assessment and a recommendation for updating the distributed environment based on the threat assessment.

20 Claims, 4 Drawing Sheets

(56) References Cited

U.S. PATENT DOCUMENTS

2022/0382736 A1 12/2022 Beilis et al.
2023/0344845 A1 * 10/2023 Cady ........................ G06F 9/547

OTHER PUBLICATIONS

S. S. G. et al. "Real-Time Enhanced GAN-Powered Intrusion Prevention System: Safeguarding Networks with Advanced AI," 2024 2nd International Conference on Computing and Data Analytics (ICCDA), Shinas, Oman, 2024, pp. 1-6, doi: 10.1109/ICCDA64887.2024.10867379. (Year: 2024).*
"Cloud Computing, Security, Content Delivery (CDN)", Akamai Technologies, Inc., Retrieved: Mar. 25, 2025, https://www.akamai.com/, 8 pages.
"Data Visibility & Control", BigID, Inc., Retrieved: Mar. 25, 2025, https://www.bigid.com/, 17 pages.
"We Stop Breaches with AI-native Cybersecurity", CrowdStrike Holdings, Inc., Retrieved: Mar. 25, 2025, https://www.crowdstrike.com/en-us/, 6 pages.

* cited by examiner

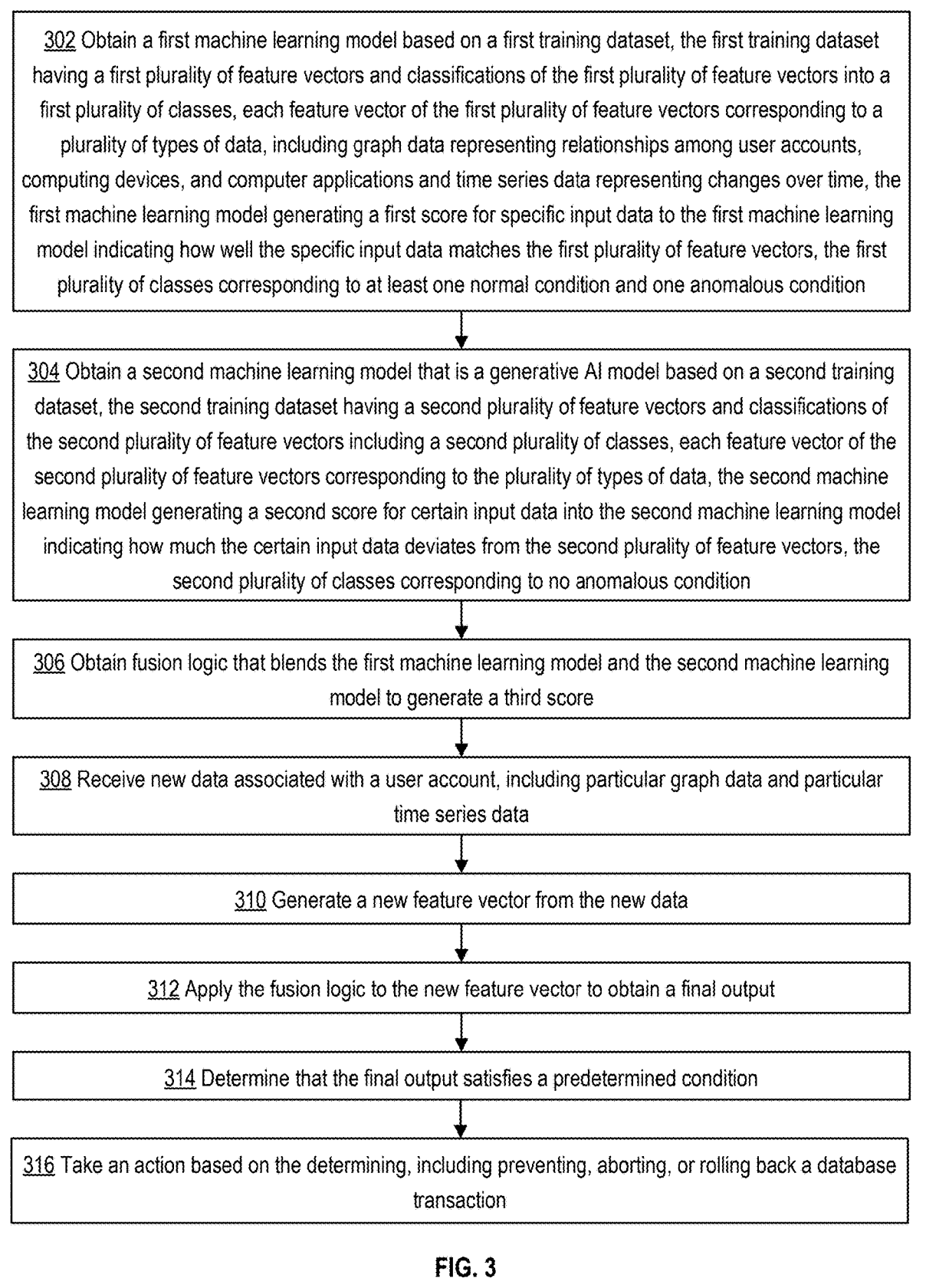

302 Obtain a first machine learning model based on a first training dataset, the first training dataset having a first plurality of feature vectors and classifications of the first plurality of feature vectors into a first plurality of classes, each feature vector of the first plurality of feature vectors corresponding to a plurality of types of data, including graph data representing relationships among user accounts, computing devices, and computer applications and time series data representing changes over time, the first machine learning model generating a first score for specific input data to the first machine learning model indicating how well the specific input data matches the first plurality of feature vectors, the first plurality of classes corresponding to at least one normal condition and one anomalous condition 304 Obtain a second machine learning model that is a generative AI model based on a second training dataset, the second training dataset having a second plurality of feature vectors and classifications of the second plurality of feature vectors including a second plurality of classes, each feature vector of the second plurality of feature vectors corresponding to the plurality of types of data, the second machine learning model generating a second score for certain input data into the second machine learning model indicating how much the certain input data deviates from the second plurality of feature vectors, the second plurality of classes corresponding to no anomalous condition 306 Obtain fusion logic that blends the first machine learning model and the second machine learning model to generate a third score 308 Receive new data associated with a user account, including particular graph data and particular time series data 310 Generate a new feature vector from the new data 312 Apply the fusion logic to the new feature vector to obtain a final output 314 Determine that the final output satisfies a predetermined condition 316 Take an action based on the determining, including preventing, aborting, or rolling back a database transaction

FIG. 3

DETECTING AND PREVENTING CYBER THREATS

TECHNICAL FIELD

The present disclosure relates to online threat management and machine learning, and more particularly to detecting and preventing digital fraud or cyberattacks using machine learning.

BACKGROUND

Today's computer systems face mounting challenges in detecting and mitigating increasingly sophisticated and evasive cyber threats. Legacy systems are reactive, generating excessive false positives. They often fail to identify novel or cross-application attack patterns. They also lack contextual clarity, offering limited insight into flagged activities. These limitations result in delayed detection, high operational cost, and tangible and intangible harm. Therefore, it would be helpful to have a threat detection system that delivers contextual, cross-application, and explainable insights-enabling rapid, accurate, and minimally manual remediation.

SUMMARY

The appended claims may serve as a summary of the invention.

BRIEF DESCRIPTION OF THE DRAWINGS

Example embodiments will now be described by way of non-limiting examples with reference to the accompanying drawings, in which:

FIG. 3 illustrates an example process of detecting or preventing cyber threats in a distributed computing environment in accordance with the embodiments disclosed herein.

DETAILED DESCRIPTION OF CERTAIN EMBODIMENTS

Figure 1:
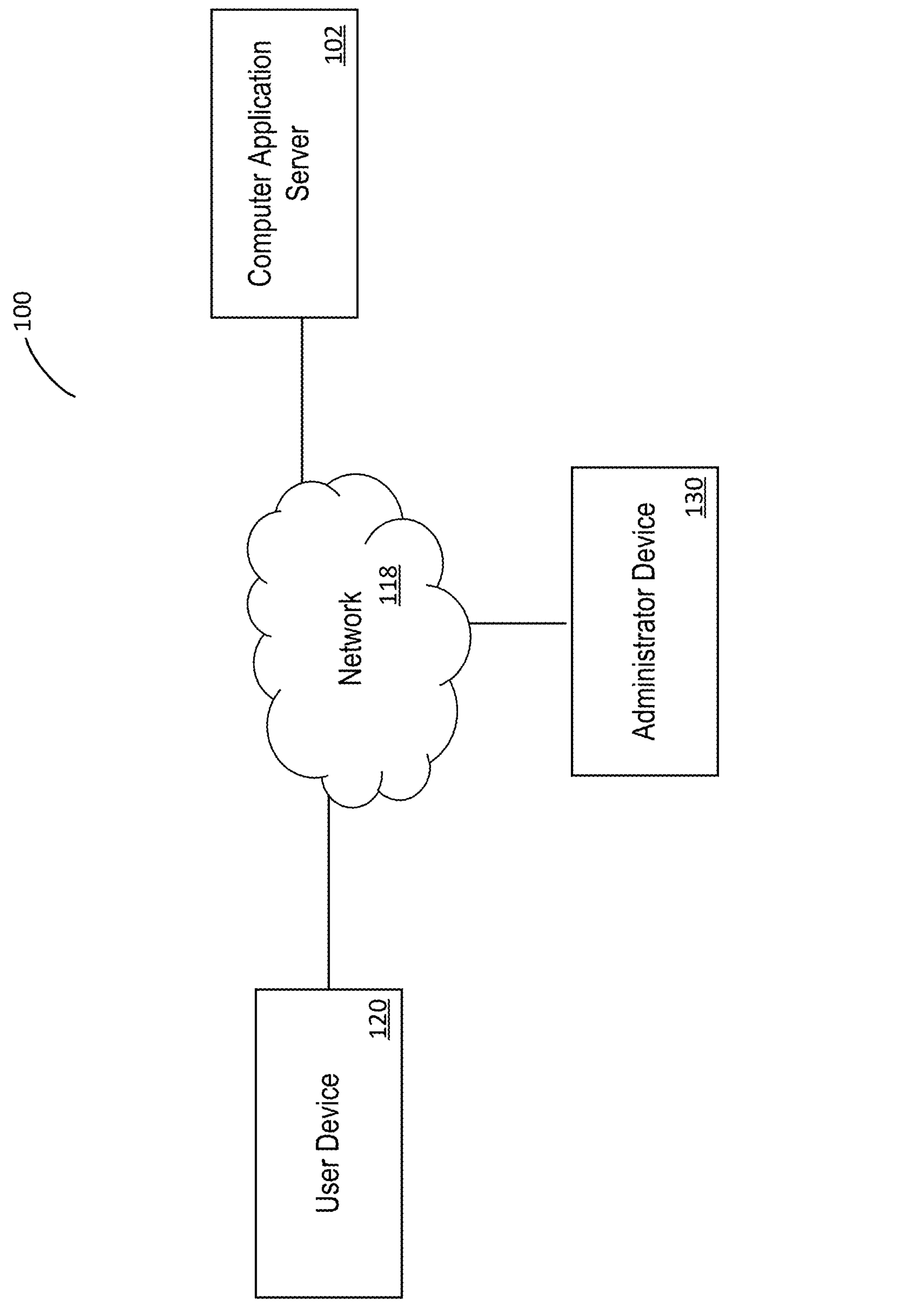
FIG. 1 illustrates an example networked computer system in which various embodiments may be practiced.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1. General Overview

A system for detecting and preventing cyber threats is disclosed. The system is programmed to collect user activity data across different computer applications and devices and threat intelligence data in a distributed computing environment. From the collected data, the system is programmed to then build a predictive model and a counterfactual reasoning model using machine learning and establish a meta model that fuses the two models together. Given new user activity data, the system is programmed to apply the meta model to generate a threat assessment and a recommendation for updating the distributed environment based on the threat assessment.

In some embodiments, a system is programmed to manage a distributed computing environment. The system is programmed to maintain system data comprising relevant information for all user accounts, computer applications, and computer devices in the distributed computing environment. The relevant information can include identifiers, basic attributes, and additional attributes related to permission, encryption, privacy, or other aspects of digital integrity and security. The system can also be programmed to collect threat intelligence data, from external threat intelligence sources or prior analysis results, as further discussed below.

In some embodiments, the system is programmed to collect user activity data, from specific interactions by user accounts with various computer applications and devices. For example, a user account initiated a new money transfer using a browser application and a banking application. The history of the user account indicates that all prior transfers were destined for domestic accounts and performed by a particular mobile phone. The new transfer, however, is to an external, overseas account, performed using a specific tablet. The user account also had recent chats with a customer support application, which showed signs of panic.

In some embodiments, the system is programmed to represent different types of data in different forms. For example, the user accounts, computer applications, and computer devices can be represented as nodes in a graph, with their attributes corresponding to properties of the nodes. Various relationships among these entities can be represented as edges, with their parameters corresponding to properties of the edges. Examples of these relationships include a user account owning a computer device, a computer device running a computer application, or a computer application communicating with a user account. Data reflecting user actions over time can be represented as time series. Information corresponding to specific conditions or events can be extracted from email messages, chats, or other non-structured communications and represented in semantic data structures.

In some embodiments, the system is programmed to transform available data for machine learning. The system can be programmed to transform the user activity data enriched with system data and threat intelligence data corresponding to a specific time period into feature vectors. Data represented in different forms can be transformed using different methods to generate embeddings that capture unique features of the respective representations. The resulting feature vectors associated with known assessments of threat levels can be used to form training datasets and validation datasets for estimating threat levels. The machine learning models are expected to associate specific data characteristics with high threat levels. Example data characteristics include a set of connected nodes in graph data representing user accounts using a computer application in an anonymous mode, a spike in the form of a large amount or to an unusual location in time series data for money transfer, or a high frequency of occurrence for keywords showing panic, duress, or other negative sentiments in semantic, contextual data.

In some embodiments, the system is programmed to build a counterfactual reasoning model using a first training dataset corresponding to normal user activities. The model attempts to reconstruct a normal version of given user activity based on the first training dataset. Its failure to do so signals the anonymous nature of the given user activity. Thus, when the model determines that the given user activity associated with a specific user account derivates from the usual user activity associated with the specific user account or normal user activity associated with other user accounts, the model output a high threat level. The model can also be set up to estimate the relative importance values of the features.

In some embodiments, the system is programmed to also build a predictive model using a second training dataset corresponding to both normal and anonymous user activities. The model attempts to predict to which of the predetermined classes given user activity belongs, where the classes represent different threat levels or corresponding system states based on the second training dataset. The model also produces a confidence value for the classification, and at least the confidence score for a class corresponding to a high threat level could be outputted as the threat level. The model can similarly be set up to estimate the relative importance values of the features.

In some embodiments, the system is programmed to fuse the two machine learning models together using a validation dataset separate from the training datasets. In the fusion process, the system is programmed to assign dynamic weights to the two machine learning models based on historical model accuracy and immediate performance. The output of the fusion process includes a meta model that includes the ultimately determined weights for combining the outputs of the two machine learning models.

In some embodiments, the system is programmed to assess the threat level for new user activity using the two machine learning models and the meta model. The system is configured to first transform new user activity together with the current system data and threat intelligence data into a set of feature vectors using the approaches described above. The system is configured to next apply the meta model to the set of feature vectors, which includes applying the two machine learning models, to obtain a threat assessment. The system is further programmed to recommend or implement specific actions based on the threat assessment or the relevant importance values of the features. For instance, a threat level can be associated with a checklist of features related to digital integrity or security, with a higher threat level requiring the confirmation of more items on the checklist. Each feature can also be associated with one or more predetermined actions, which are implemented when the corresponding relative importance value exceeds a specific threshold. In the example given above, the result of applying the meta model can be a high threat level particularly linked to the relationship between the user account and the overseas account, the relationship between the use of the specific tablet and the prior user of other devices, and the indication of panic associated with the user account. The system can be programed to thus increase the authentication strength associated with the user account or the banking transactions based on these relationships or suspend or reverse such transactions.

The system disclosed herein has several technical benefits. By combining data across different applications and devices, the system operates on a comprehensive view of the cyber threat landscape and enables accurate assessment of the threat level and proper response. By representing data from different sources in different formats and transforming them into feature vectors that capture the nuances of those formats, the system also operates on a rich, contextual understanding of the current user activities and further improves the threat assessment and response. By fusing a predictive model and a counterfactual reasoning model, the system offers a rigorous, balanced evaluation of threat levels that tend to reduce the number of false positives. Furthermore, by recommending or implementing actions responsive to significant threat levels, the system helps ensure digital integrity and security, reducing or preventing harm from online fraud or other cyberattacks.

2. Example Computing Environments

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, a networked computer system 100 comprises a computer application server ("server") 102, a user device 120, and an administrator device 130, which are communicatively coupled through direct physical connections or via a network 118.

In some embodiments, the server 102 is programmed or configured to detect and prevent cyber threats in a distributed computing environment. The server 102 is programmed to collect data related to user activity and system update, analyze the data using machine learning or other advanced computational models, and recommend or implement appropriate response to potential cyber threats. The server 102 can comprise any centralized or distributed computing facility with sufficient computing power in data processing, data storage, and network communication for performing the above-mentioned functions.

In some embodiments, the administrator device 130 is programmed or configured to evaluate threat assessments or recommended preventive or remedial actions and provide confirmation or other feedback. The administrator device 130 can comprise any personal computing device, such as a desktop computer, laptop computer, or tablet computer. In other embodiments, some of the functions performed by the administrator device 130 can be performed by the server 102.

In some embodiments, the user device 120 is programmed or configured to perform various activities or transactions in the distributed computing environment. The activities involve interactions by a user account with various computer applications or devices. The user device 120 can comprise any personal computing device, such as a desktop computer, laptop computer, or tablet computer.

The network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), or the Internet, a terrestrial or satellite link.

In some embodiments, the user device 120 is programmed to interact with computer applications and devices in the distributed computing environment. The server 102 is programmed to continuously collect data resulting from such interactions. After building computational models for evaluating threat levels of user activities given the corresponding operational status of the system and threat intelligence applicable to the system, the server 102 is programmed to assess the threat level of new user activities by applying these computational models and further determine appropriate actions in response to the threat level. The server 102 can be programmed to send data regarding the new user activities, the threat level, or the actions to the administrator device 130 as a routine or in escalated circumstances. The administrator device 130, which can be associated with an administrator account, is programmed to provide approval, rejection, or other feedback on the received data. The server 102 can be programmed to revise or implement the actions or update the computational models based on the feedback from the administrator device.

3. Functional Descriptions

Figure 2:
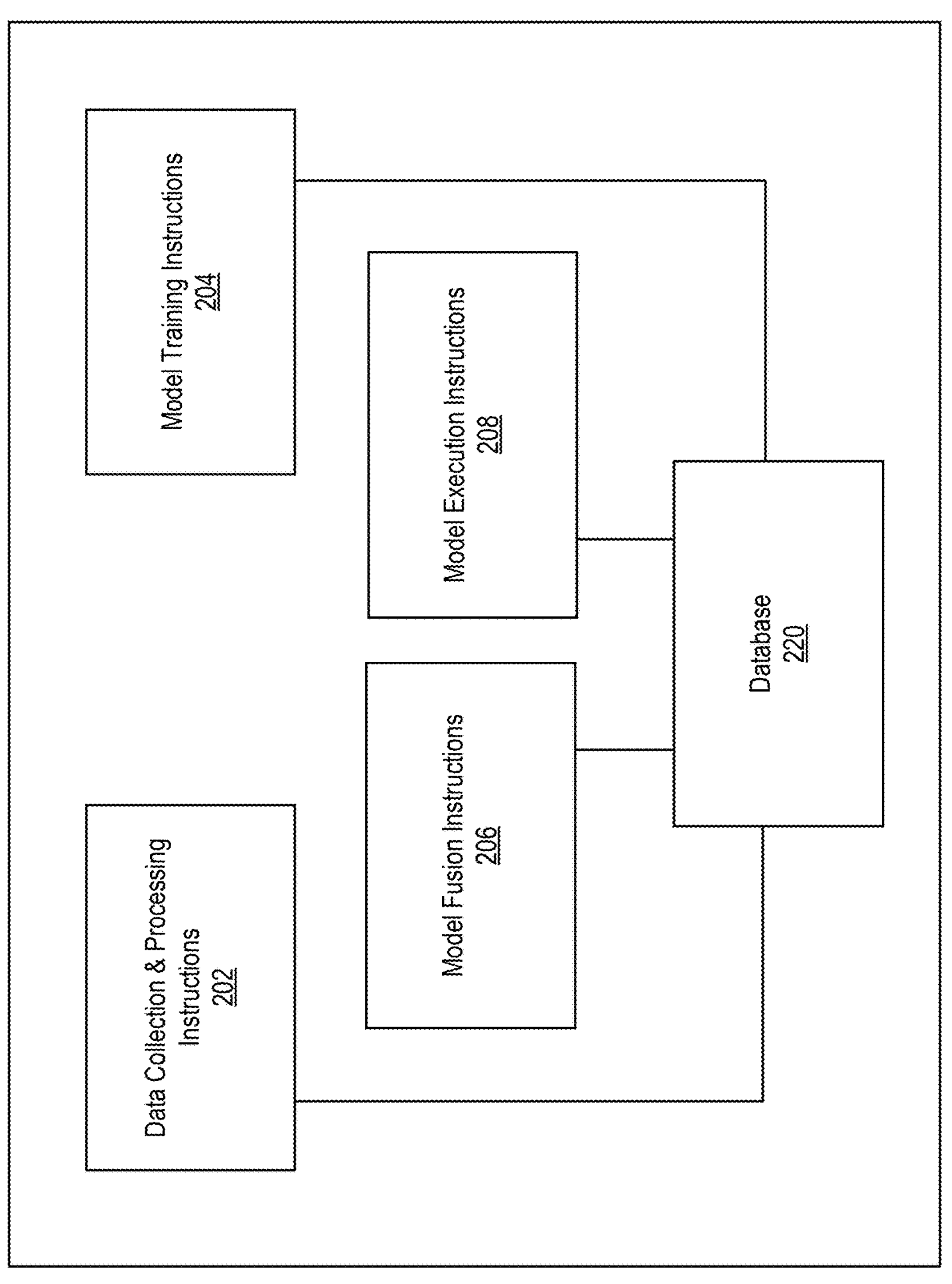
FIG. 2 illustrates example computer components of the computer application server in accordance with the embodiments disclosed herein.

FIG. 2 illustrates example computer components of the computer application server in accordance with the embodiments disclosed herein. The figure is for illustration purposes only and the server 102 can comprise fewer or more functional or storage components. Each of the functional components can be implemented as software components, general or specific-purpose hardware components, firmware components, or any combination thereof. Each of the functional components can also be coupled with one or more storage components. A storage component can be implemented using any of relational databases, object databases, flat file systems, or JavaScript Object Notation (JSON) stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the server 102 comprises the data collection and processing component 202, the model training component 204, the model fusion component 206, and the model execution component. The server 102 also comprises a database 220. The data collection and processing component 202 enables processing user activity data and threat intelligence data in the distributed computing environment in real time. The model training component 204 enables building individual machine learning model for basic threat assessment and mitigation. The model fusion component 206 enables building a fusion of the individual machine learning models together for advanced threat assessment and mitigation. The model execution component 208 enables applying the fusion of the machine learning model to newly processed data to detect and prevent cyber threats. The database 220 stores various pieces of data collected, processed, or generated by the functional components, such as the user activity data, threat intelligence data, machine learning models, training datasets, validation datasets, model execution results, explanations of execution results, and recommendations or instructions for threat prevention or mitigation. These components are further discussed in detail below.

3.1. Data Collection and Processing

In some embodiments, the server 102 is programmed to continuously collect different types of data that reflect a state of a distributed computing environment to detect or prevent online fraud or cybersecurity breach. The different types of data include user data and threat intelligence data. The user data covers activity data associated with user accounts. The activity data can include interactions with a user interface (UI) or calls to an application programming interface (API). For example, rapid form completion or erratic mouse behavior could be signs of problems. Simultaneous logins from different geographical locations or repeated password resets can similarly signal problems. The activity data can include other communications with applications, such as email messages, database queries, or browser requests. The server 102 can be programmed to condense such communications into relevant information by retaining keywords or descriptions related to sources or impacts of cybersecurity issues. For example, the keywords or descriptions could be related to unhealthy mental states or unexpected behavior in the given organizational context. The user account data can include information related to a user and an associated user device, such as a user identifier or a device's network address. The server 102 can be programmed to collect the user data in real time or from corresponding written logs according to a predetermined schedule.

In some embodiments, the server 102 is programmed to collect the threat intelligence data from various sources. The treat intelligence data can come from prior fraud or threat analysis of user activities within the distributed computing environment. Additional sources of threat intelligence data include traditional threat intelligence platforms or additional platforms that specialize in surfacing signals from high-friction environments, such as darknets, illicit forums, or encrypted apps. The server 102 can be programmed to cleanse and normalize the different types of collected data into pre-processed data using existing data cleanup or validation tools before any conversion into feature vectors for machine learning.

In some embodiments, the server 102 is programmed to generate feature vectors from the pre-processed data that represents user activity associated with a user account and threat intelligence associated with the distributed computing environment at a given time. The server 102 can be programmed to consider a period associated with that given time and generate feature vectors from all the pre-processed data created during that period of time. Depending on the form or nature of specific pre-processed data, the server 102 is programmed to apply specific methods to generate corresponding feature vectors. The server 102 can be programmed to also associate each feature vector with a label that indicates the corresponding, known threat level for fraud or security breach, such as normal condition, anomaly, precursor, fraud or breach, remediation, or another status, as further discussed in Section 3.4.

In some embodiments, some pre-processed data describes relationships between entities, such as an association of a user account with a device or an application based on each user activity, and the pre-processed data can be represented as graph data. For example, the pre-processed data can indicate that a user account owns a device in this location or communicates with an application at that time, where the user account, the device, and the application could each be represented as a node, the owning and "communicating with" relationships between them could each be represented as an edge, and the location or time information could each represented as metadata for the nodes or the edges in a graph. With this data representation, a communication with an application that is unauthorized or that occurs during afterhours could be a sign of a problem, for instance. The server 102 can be programmed to then apply existing methods to generate feature vectors as embeddings, which could encode nodes, edges, or a combination of both. For example, a random walk-based method performs biased random walks to generate node sequences, while a graph neural network initiate node features and aggregate neighbor features using neural layers to create embeddings for the entire graph.

In some embodiments, some pre-processed data describe temporal relationships, such as the arguments of an API call changing over time, and the pre-processed data can be represented as time series. For example, the pre-processed data can indicate that a user account submits on online banking request several times to transfer money, and a new target account or an unusually large amount for the money transfer in the most recent online banking request can be a sign of a problem. The server 102 can be programmed to then apply existing methods to generate feature vectors as embeddings, such as a recurrent neural network, a transformer that models temporal dynamics, or another type of machine learning model for representing sequential data with temporal dependencies.

In some embodiments, some pre-processed data describe key concepts with context, such as excerpts of email messages related to specific financial transactions or personal safety, and the pre-processed data can be represented as a blob of words or other tokens. For instance, an excerpt including cryptic or senseless language or indicating suspicion or duress could signal a problem. The server 102 can be programmed to then apply existing methods to generate feature vectors as embeddings, such as a convolutional neural network, a transformer that models semantic relationships, or another machine learning model for representing sequential data with semantic dependencies.

In some embodiments, the server 102 is programmed to convert the pre-processed data into feature vectors based on the original format, such as images or audio, or the original organization, such as paragraphs, tables or spatial divisions. It is to be appreciated that the types of pre-processed data and feature vectors specifically discussed herein include non-exhaustive examples. The server 102 can also be programmed to select a default method for generating feature vectors, such as converting arbitrary pre-processed data to strings and further converting them into feature vectors using a transformer.

In some embodiments, the server 102 can be programmed to fuse different types of embeddings together to generate hybrid embeddings using known methods. For instance, the server 102 can be configured to assign dynamic importance to different embedding types using attention-based weighting and compute a fusion of the different types of embeddings via a weighted sum using feedforward layers and a softmax function. Alternatively, the server 102 can be configured to project embeddings into a shared space and pass the results through a linear layer. The server 102 can also be programmed to cleanse or normalize the set of feature vectors by dimension reduction, feature scaling, dimension projection, or other feature enhancement techniques. The result can then be a training dataset of feature vectors as individual embeddings or hybrid embeddings, which can be accompanied by the corresponding labels.

3.2. Machine Learning Model Training

In some embodiments, the server 102 is programmed to build a counterfactual reasoning model using generative AI, which creates new content. The server 102 is programmed to first obtain a specific training dataset representing normal conditions in connection with no fraud or security breach signals, which can be a subset of the training dataset discussed in the previous section. The server 102 can be programmed to then train the counterfactual reasoning model using the specific training dataset. The counterfactual reasoning model can be implemented using known generative artificial intelligence (AI) model architecture that attempts to reconstruct given inputs based on the training data while generalizing to novel instances through semantic guidance in latent representation. Example model architecture includes variational autoencoder or generative adversarial network (the discriminator not used during inference or execution).

The counterfactual reasoning model is expected to reconstruct the input data as a corresponding "normal version", with a reconstruction error indicating how much this "normal version" differs from the input data. For anomalous input data, the corresponding "normal version" would be rather different, leading to a relatively large reconstruction error. Therefore, for given input data, a relatively large reconstruction error is a strong signal of a problem in the given input data pointing to existing or upcoming fraud or security breach, based on the rationale that the given input data deviates much from known normal conditions. When the model architecture includes an attention mechanism, the attention weights can be used as a proxy for importance indicators for the feature vectors ("feature importance scores").

In some embodiments, the server 102 is programmed to build a predictive model using machine learning, which does not require generative AI. The server 102 can be programmed to train the predictive model using the training dataset discussed in the previous section covering all possible threat levels or statuses. The predictive model can be implemented using conventional AI model architecture that produces a classification result and an associated confidence value, which correspond to a membership of a predetermined class and the confidence of that membership. Examples model architecture includes random forest, eXtreme Gradient Boosting (xGBoost), or deep neural network.

Therefore, for given input data, a relatively large confidence value associated with a fraud or security breach class, for example, is a strong signal of a problem in the given input data, based on the rationale that the given input data closely resembles known anomalous conditions. Instead of the confidence value associated with a single class, the score produced by the predictive model can be a weighted average, where each class is given a value that is larger for a higher threat level, which is then weighted by the corresponding confidence value. In addition, the predictive model can comprise one or more different models, and in the latter case the predictive model can be an ensemble model that outputs an aggregate of the outputs produced by the individual models. When the model architecture is not designed to have built-in feature importance scores, downstream model-agnostic tools can be used to assess the relative importance of feature vectors based on the training dataset. Such a tool, such as the SHapley Additive explanations (SHAP) framework, can also be applied to new feature vectors.

3.3. Machine Learning Model Fusion

While the predictive model can flag anomalies in the entire feature space, the counterfactual reasoning model can help reveal whether the anomaly is strategically manipulative or merely atypical, including exposing borderline manipulations. Therefore, in some embodiments, the server 102 is programmed to combine the counterfactual reasoning model and the predictive model by normalizing the outputs of the two base models and fusing the two models in a meta model. The fusion can be implemented using a known process, such as Bayesian optimization. During such fusion, the based models are executed on a validation dataset, which can be part of the training dataset discussed in the previous section that is not used to train the two base models.

Bayesian optimization typically starts with an initialization stage to evaluate the meta model at a few chosen sets of meta parameter values, initialize a surrogate model based on these evaluations, and find the next set of meta parameter values that optimizes a given acquisition function based on the surrogate model. In some embodiments, the set of meta parameter values can be chosen at random or according to another predetermined strategy. The meta model can be a dynamic weighted ensemble as a linear (or higher-complexity) combination of the outputs (e.g., scores) of the two base models, the meta parameters can be the linear weights for combining the outputs of the two base models, and the evaluation of the meta model can comprise executing the two base models with fixed hyperparameter values and combining their outputs using the dynamic weighted ensemble. The surrogate model is used to estimate the value of the objective function, which can be a measure of how the output of the weighted ensemble deviates from the ground truth. The surrogate model can be implemented as a Gaussian process or other known alternatives. The objective function can include the F1-score, root mean squared error (RMSE), or other similar measures. Bayesian optimization then follows an iterative process until a predetermined condition is met. Examples of the predetermined condition include when a certain number of iterations has been performed or when a certain validation accuracy over the validation dataset has been achieved. In each iteration, the meta model is evaluated at the set of meta parameter values found at the previous iteration, the surrogate model is updated based on the evaluation, and the next set of meta parameter values is computed based on the updated surrogate model.

In some embodiments, the meta model can be a fixed weighted ensemble as a linear combination of the outputs (e.g., scores) of the two base models, the meta parameters can be the hyperparameters of the two base models, and the evaluation of the meta model can comprise executing the two base models using dynamic hyperparameter values and combining their outputs using the fixed weighted ensemble. In certain embodiments, instead of combining the contributions of the two base models, the meta model can comprise using the output of one base model to determine the input of the other base model. In other embodiments, instead of Bayesian optimization, conventional machine learning, such as neural network or evolutionary algorithm, can be used to learn the weights for combining the two base models. In yet some other embodiments, the weights determined in the weight ensemble or learned via machine learning could be set at the model level or the feature level. In either case, the feature importance scores can be adjusted accordingly.

In some embodiments, the fixed or final hyperparameter values and the fixed or final weighted ensemble are the used to produce a final output score as the estimated threat level, as further discussed below.

3.4. Machine Learning Model Execution

In some embodiments, the server 102 is programmed to collect user data and threat intelligence data and generate feature vectors, as discussed in Section 3.1. After establishing the training dataset, training the two machine learning models using the training dataset, and creating a meta model in fusing the two machine learning models together, as discussed in Sections 3.2 and 3.3, the server 102 is programmed to assess the threat level of new user activity. Given a new feature vector that represents user activity associated with a user account and threat intelligence associated with the distributed computing environment at a given time, the server 102 is programmed to, in real time, execute the two machine learning models on the feature vector to obtain two scores, one reconstruction error and one confidence value, and execute the meta model on the two scores to obtain a final score. The server 102 can be programmed to assess the level of threat or amount of risk based on the final score and determine how to handle the user activity that is considered high risk, such as exceeding a predetermined threshold.

In some embodiments, the server 102 is programmed to reject a request, reverse an action, or make a further evaluation based on the final score. For example, when the user activity involves a request to access specific personal information, the request can be rejected or suspended, and when the user activity involves withdrawing money from a bank account, a command to electronically deposit the withdrawn amount back into the bank account can be issued and executed to reverse the withdrawal. In certain embodiments, the server 102 is programmed to evaluate the feature importance scores and take appropriate action.

As one example, when the feature importance score for the feature of user identity exceeds a predetermined threshold, the server 102 can be programmed to enforce a higher level of authentication for the user account, such as multi-factor authentication. As another example, when the feature importance score for the feature of malware alert is greater than the next largest feature importance score by a predetermined factor, the server 102 can be programmed to turn on advanced anti-virus protection features. In certain embodiments, when the further evaluation leads to a human review, the evaluation result can be used as a label associated with this feature vector, which can be added to the training dataset for retraining the machine learning models.

4. Example Processes

FIG. 3 illustrates a process of detecting and preventing cyber threats in a distributed environment in accordance with disclosed embodiments. FIG. 3 is shown in simplified, schematic format for purposes of illustrating a clear example and other embodiments may include more, fewer, or different elements connected in various manners. FIG. 3 is intended to disclose an algorithm, plan, or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In step 302, the server 102 is programmed to obtain a first machine learning model based on a first training dataset. The first training dataset has a first plurality of feature vectors and classifications of the first plurality of feature vectors into a first plurality of classes. Each feature vector of the first plurality of feature vectors corresponds to a plurality of types of data, including graph data representing relationships among user accounts, computing devices, and computer applications and time series data representing changes over time. The first machine learning model generates a first score for specific input data to the first ML model indicating how well the specific input data matches the first plurality of feature vectors. The first plurality of classes corresponds to at least one normal condition and one anomalous condition.

In some embodiments, the plurality of types of data includes contextual data representing narratives in natural language. In certain embodiments, obtaining the first machine learning model comprises train the first machine learning model. In other embodiments, obtaining the first machine learning model comprises generating a first set of feature importance scores from the first machine learning model for features of the first plurality of feature vectors. In yet other embodiments, the first machine learning model corresponds to random forest, eXtreme Gradient Boosting (xGBoost), or deep neural network.

In step 304, the server 102 is programmed to obtain a second ML model that is a genAI model based on a second training dataset. The second training dataset has a second plurality of feature vectors and classifications of the second plurality of feature vectors including a second plurality of classes. Each feature vector of the second plurality of feature vectors corresponds to the plurality of types of data. The second ML model generates a second score for certain input data into the second ML model indicating how much the certain input data deviates from the second plurality of feature vectors. The second plurality of classes corresponds to no anomalous condition.

In some embodiments, obtaining the second machine learning model comprises training the second machine learning model. In certain embodiments, obtaining the second machine learning model comprises generating a second set of feature importance scores from the second machine learning model for features of the second plurality of feature vectors. In other embodiments, the second machine learning model corresponds to variational autoencoder or generative adversarial network.

In step 306, the server 102 is programmed to obtain fusion logic that blends the first ML model and the second ML model to generate a third score.

In some embodiments, obtaining the fusion logic comprises executing the first machine learning model and the second machine learning model on a validation dataset separate from the first training dataset and the second training dataset in a Bayesian optimization framework. In certain embodiments, the obtaining fusion logic comprises combining the first set of feature importance scores and the second set of feature importance scores into a final set of feature importance scores. In other embodiments, the fusion logic includes a meta model being a weighted ensemble, and applying the fusion logic comprises executing the first machine learning model and the second machine learning model and applying the weighted ensemble to results of the executing.

In step 308, the server 102 is programmed to receive new data associated with a user account, including particular graph data and particular time series data.

In some embodiments, the new data represents user activity associated with the user account and threat intelligence associated with the distributed computing environment at a given time.

In step 310, the server 102 is programmed to generate a new feature vector from the new data.

In some embodiments, the generating a new feature vector comprises converting the particular graph data using a random walk-based method or a graph neural network and converting the particular time series data using a recurrent neural network or a transformer that models temporal dynamics.

In step 312, the server 102 is programmed to apply the fusion logic to the new feature vector to obtain a final output.

In step 314, the server 102 is programmed to determine that the final output satisfies a predetermined condition.

In step 316, the server 102 is programmed to take an action based on the determining, including preventing, aborting, or rolling back a database transaction.

In some embodiments, the taking an action comprises generating a recommendation based on the final set of feature importance scores. In certain embodiments, the action includes rejecting a request for a data access operation or reversing a data access operation.

In other embodiments, the action includes obtaining an assessment of the new data from an administrator device. The server 102 is programmed to then update the first training dataset or the second training dataset to obtain an updated first training dataset or an updated second training dataset and retain the first machine learning model based on the updated first training dataset or the second machine learning model based on the updated second training dataset.

5. Example Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
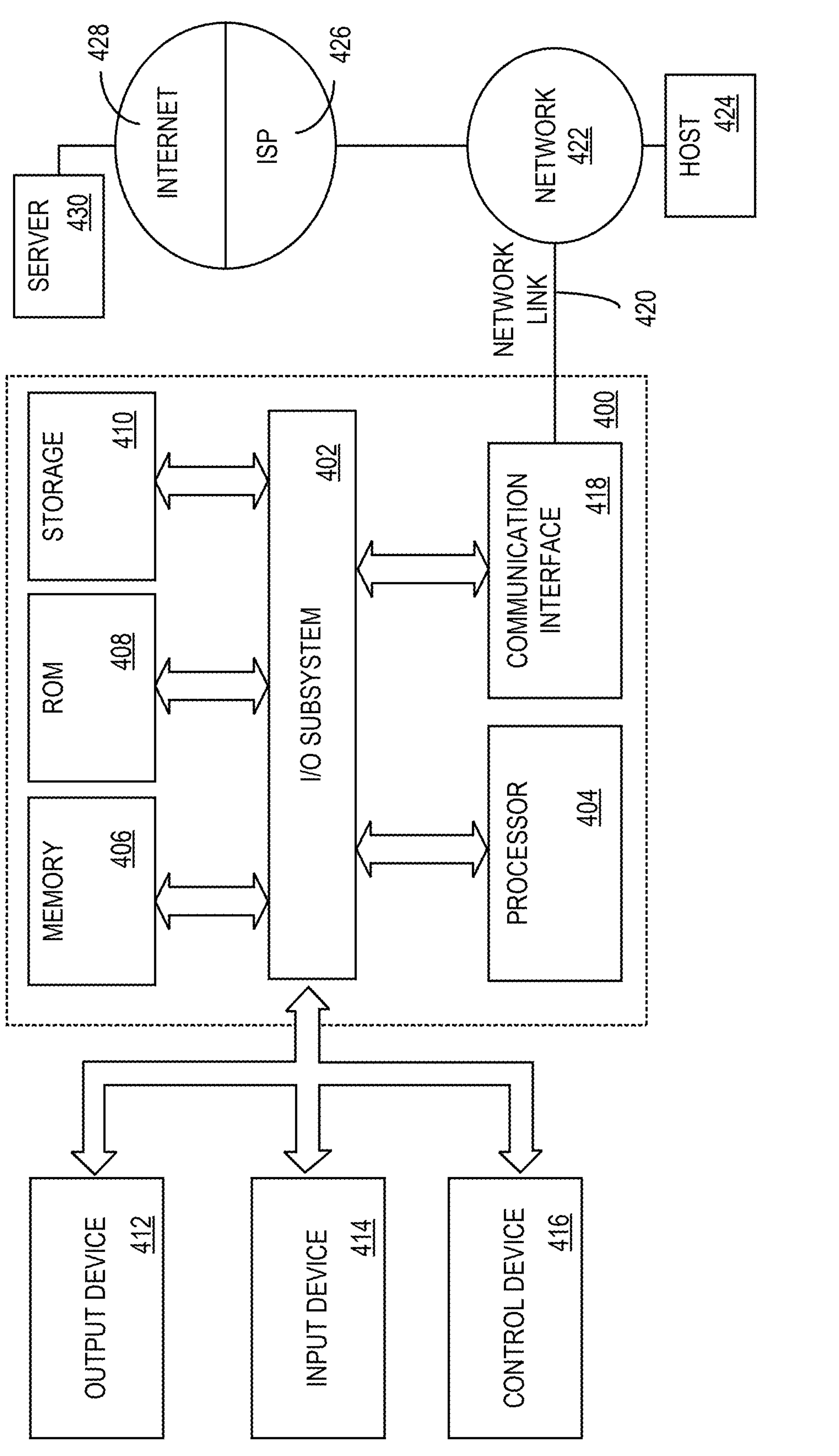
FIG. 4 illustrates an example computer system upon which various embodiments may be implemented.

FIG. 4 illustrates an example computer system upon which various embodiments may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or Advanced RISC Machines (ARM) processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as flash memory, or solid-state storage, magnetic disk, or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement Transmission Control Protocol/Internet Protocol (TCP/IP), Hypertext Transfer Protocol (HTTP) or other communication protocols; file processing instructions to interpret and render files coded using HTML, XML, Joint Photographic Experts Group (JPEG), Moving Picture Experts Group (MPEG) or Portable Network Graphics (PNG); user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators, or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on the output device 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware, and interfaces for generating position reporting packets, notifications, pulse or heartbeat signals, or other recurring data transmissions that specify a position of the computer system 400, alone or in combination with other application-specific data, directed toward host computer 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to I/O subsystem 402. Communication interface 418 provides a two-way data communication coupling to network link(s) 420 that are directly or indirectly connected to at least one communication network, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a LAN, WAN, campus network, internetwork, or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic, or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. To ensure data security and privacy, network communications may be encrypted using Transport Layer Security (TLS), Secure/Multipurpose Internet Mail Extensions (S/MIME), or other cryptographic methods. Network devices such as firewalls, intrusion detection/prevention systems (IDS/IPS), and proxy servers may be deployed to protect computer system 600 components from unauthorized access or cyber threats.

A server 430 may be coupled to internet 428. Server 430 broadly represents any computer, data center, virtual machine, or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, Uniform Resource Locator (URL) strings with parameters in HTTP payloads, application programming interface (API) calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using SQL or NoSQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method of detecting or preventing cyber threats in a distributed computing environment, comprising:

obtaining a first machine learning model based on a first training dataset, the first training dataset having a first plurality of feature vectors and classifications of the first plurality of feature vectors into a first plurality of classes, each feature vector of the first plurality of feature vectors corresponding to a plurality of types of data, including graph data representing relationships among user accounts, computing devices, and computer applications and time series data representing changes over time, the first machine learning model generating a first score for specific input data to the first machine learning model indicating how well the specific input data matches the first plurality of feature vectors, the first score including an aggregate of a plurality of scores for the first plurality of classes, the first plurality of classes corresponding to at least multiple abnormal conditions;

obtaining a second machine learning model that is a generative AI model based on a second training dataset, the second training dataset having a second plurality of feature vectors and classifications of the second plurality of feature vectors including a second plurality of classes, each feature vector of the second plurality of feature vectors corresponding to the plurality of types of data, the second machine learning model generating a second score for certain input data into the second machine learning model indicating how much the certain input data deviates from the second plurality of feature vectors, the second plurality of classes corresponding to no anomalous condition;

obtaining fusion logic that blends the first machine learning model and the second machine learning model to generate a third score, comprising using an output of the second machine learning model to determine an input of the first machine learning model;

receiving new data associated with a user account, including particular graph data and particular time series data;

generating a new feature vector from the new data;

applying the fusion logic to the new feature vector to obtain a final output;

determining that the final output satisfies a predetermined condition;

taking an action based on the determining, including preventing, aborting, or rolling back a database transaction, wherein the method is performed by one or more processors.

2. The method of claim 1, the plurality of types of data including contextual data representing narratives in natural language.

3. The method of claim 1, obtaining the first machine learning model comprising training the first machine learning model, obtaining the second machine learning model comprising training the second machine learning model.

4. The method of claim 1, the first machine learning model corresponding to random forest, eXtreme Gradient Boosting (xGBoost), or deep neural network, the second machine learning model corresponding to variational autoencoder or generative adversarial network.

5. The method of claim 1, obtaining the fusion logic comprising executing the first machine learning model and the second machine learning model on a validation dataset separate from the first training dataset and the second training dataset in a Bayesian optimization framework.

6. The method of claim 1, the fusion logic including a meta model being a weighted ensemble, applying the fusion logic comprising executing the first machine learning model and the second machine learning model and applying the weighted ensemble to results of the executing.

7. The method of claim 1, the generating a new feature vector comprising converting the particular graph data using a random walk-based method or a graph neural network and converting the particular time series data using a recurrent neural network or a transformer that models temporal dynamics.

8. The method of claim 1, the new data representing user activity associated with the user account and threat intelligence associated with the distributed computing environment at a given time.

9. The method of claim 1, obtaining the first machine learning model comprising generating a first set of feature importance scores from the first machine learning model for features of the first plurality of feature vectors, obtaining the second machine learning model comprising generating a second set of feature importance scores from the second machine learning model for features of the second plurality of feature vectors.

10. The method of claim 9, the obtaining fusion logic comprising combining the first set of feature importance scores and the second set of feature importance scores into a final set of feature importance scores, the taking an action comprising generating a recommendation based on the final set of feature importance scores.

11. The method of claim 1, the action including rejecting a request for a data access operation or reversing a data access operation.

12. The method of claim 1, the action including obtaining an assessment of the new data from an administrator device; the method further comprising:

updating the first training dataset or the second training dataset to obtain an updated first training dataset or an updated second training dataset;

retaining the first machine learning model based on the updated first training dataset or the second machine learning model based on the updated second training dataset.

13. A system for detecting or preventing cyber threats in a distributed computing environment, comprising:

a memory;

one or more processors coupled with the memory and configured to perform:

obtaining a first machine learning model based on a first training dataset, the first training dataset having a first plurality of feature vectors and classifications of the first plurality of feature vectors into a first plurality of classes, each feature vector of the first plurality of feature vectors corresponding to a plurality of types of data, including graph data representing relationships among user accounts, computing devices, and computer applications and time series data representing changes over time, the first machine learning model generating a first score for specific input data to the first machine learning model indicating how well the specific input data matches the first plurality of feature vectors, the first score including an aggregate of a plurality of scores for the first plurality of classes, the first plurality of classes corresponding to at least multiple abnormal conditions;

obtaining a second machine learning model that is a generative AI model based on a second training dataset, the second training dataset having a second plurality of feature vectors and classifications of the second plurality of feature vectors including a second plurality of classes, each feature vector of the second plurality of feature vectors corresponding to the plurality of types of data, the second machine learning model generating a second score for certain input data into the second machine learning model indicating how much the certain input data deviates from the second plurality of feature vectors, the second plurality of classes corresponding to no anomalous condition;

obtaining fusion logic that blends the first machine learning model and the second machine learning model to generate a third score, comprising using an output of the second machine learning model to determine an input of the first machine learning model;

receiving new data associated with a user account, including particular graph data and particular time series data;

generating a new feature vector from the new data;

applying the fusion logic to the new feature vector to obtain a final output;

determining that the final output satisfies a predetermined condition;

taking an action based on the determining, including preventing, aborting, or rolling back a database transaction.

14. The system of claim 13, obtaining the fusion logic comprising executing the first machine learning model and the second machine learning model on a validation dataset separate from the first training dataset and the second training dataset in a Bayesian optimization framework.

15. The system of claim 13, the fusion logic including a meta model being a weighted ensemble, applying the fusion logic comprising executing the first machine learning model and the second machine learning model and applying the weighted ensemble to results of the executing.

16. The system of claim 13, the new data representing user activity associated with the user account and threat intelligence associated with the distributed computing environment at a given time.

17. The system of claim 13, obtaining the first machine learning model comprising generating a first set of feature importance scores from the first machine learning model for features of the first plurality of feature vectors, obtaining the second machine learning model comprising generating a second set of feature importance scores from the second machine learning model for features of the second plurality of feature vectors.

18. The system of claim 17, the obtaining fusion logic comprising combining the first set of feature importance scores and the second set of feature importance scores into a final set of feature importance scores, the taking an action comprising generating a recommendation based on the final set of feature importance scores.

19. The system of claim 13, the action including rejecting a request for a data access operation or reversing a data access operation.

20. A non-transitory, computer-readable storage medium storing one or more sequences of instructions which when executed cause one or more processor to perform:

obtaining a first machine learning model based on a first training dataset, the first training dataset having a first plurality of feature vectors and classifications of the first plurality of feature vectors into a first plurality of classes, each feature vector of the first plurality of feature vectors corresponding to a plurality of types of data, including graph data representing relationships among user accounts, computing devices, and computer applications and time series data representing changes over time, the first machine learning model generating a first score for specific input data to the first machine learning model indicating how well the specific input data matches the first plurality of feature vectors, the first score including an aggregate of a plurality of scores for the first plurality of classes, the first plurality of classes corresponding to at least multiple abnormal conditions;

obtaining a second machine learning model that is a generative AI model based on a second training dataset, the second training dataset having a second plurality of feature vectors and classifications of the second plurality of feature vectors including a second plurality of classes, each feature vector of the second plurality of feature vectors corresponding to the plurality of types of data, the second machine learning model generating a second score for certain input data into the second machine learning model indicating how much the certain input data deviates from the second plurality of feature vectors, the second plurality of classes corresponding to no anomalous condition;

obtaining fusion logic that blends the first machine learning model and the second machine learning model to generate a third score, comprising using an output of the second machine learning model to determine an input of the first machine learning model;

receiving new data associated with a user account, including particular graph data and particular time series data;

generating a new feature vector from the new data;

applying the fusion logic to the new feature vector to obtain a final output;

determining that the final output satisfies a predetermined condition;

taking an action based on the determining, including preventing, aborting, or rolling back a database transaction.

* * * * *